United States Patent
Kong et al.

(10) Patent No.: US 10,822,438 B2
(45) Date of Patent: Nov. 3, 2020

(54) CATALYST SYSTEM FOR ENHANCED STEREO-SPECIFICITY OF OLEFIN POLYMERIZATION AND METHOD FOR PRODUCING OLEFIN POLYMER

(71) Applicant: Formosa Plastics Corporation, USA, Livingston, NJ (US)

(72) Inventors: Gapgoung Kong, Sugarland, TX (US); Lei Zhang, Port Lavaca, TX (US); Chih-Jian Chen, Port Lavaca, TX (US); Yiqun Fang, Port Lavaca, TX (US); Demin Xu, Port Lavaca, TX (US); Guangxue Xu, Port Lavaca, TX (US)

(73) Assignee: Formosa Plastics Corporation, Livingston, NJ (US)

( * ) Notice: Subject to any disclaimer, the term of this patent is extended or adjusted under 35 U.S.C. 154(b) by 0 days.

(21) Appl. No.: 15/590,478

(22) Filed: May 9, 2017

(65) Prior Publication Data

US 2018/0327520 A1    Nov. 15, 2018

(51) Int. Cl.
| | |
|---|---|
| C08F 4/44 | (2006.01) |
| C08F 4/42 | (2006.01) |
| C08F 4/654 | (2006.01) |
| C08F 4/655 | (2006.01) |
| C10M 133/16 | (2006.01) |
| C08F 110/06 | (2006.01) |

(52) U.S. Cl.
CPC ................... C08F 110/06 (2013.01)

(58) Field of Classification Search
CPC .. C08F 4/44; C08F 4/42; C08F 4/6555; C08F 4/6543; C10M 133/16
See application file for complete search history.

(56) References Cited

U.S. PATENT DOCUMENTS

| | | |
|---|---|---|
| 4,107,414 A | 8/1978 | Giannini et al. |
| 4,186,107 A | 1/1980 | Wagner |
| 4,220,554 A | 9/1980 | Scata' et al. |
| 4,226,963 A | 10/1980 | Giannini et al. |
| 4,294,721 A | 10/1981 | Cecchin et al. |
| 4,315,835 A | 2/1982 | Scata' et al. |
| 4,330,649 A | 5/1982 | Kioka et al. |
| 4,347,160 A | 8/1982 | Epstein et al. |
| 4,382,019 A | 5/1983 | Greco |
| 4,435,550 A | 3/1984 | Ueno et al. |
| 4,439,540 A | 3/1984 | Cecchin et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 4,816,433 A | 3/1989 | Terano et al. |
| 4,978,648 A | 12/1990 | Barbe' et al. |
| 5,106,807 A | 4/1992 | Morini et al. |
| 5,208,302 A | 5/1993 | Nakajo et al. |
| 5,407,883 A | 4/1995 | Fushimi et al. |
| 5,684,173 A | 11/1997 | Hosaka et al. |
| 5,902,765 A | 5/1999 | Takahashi et al. |
| 5,948,872 A | 9/1999 | Kioka et al. |
| 6,048,818 A | 4/2000 | Morini et al. |
| 6,121,483 A | 9/2000 | Fushimi et al. |
| 6,228,961 B1 | 5/2001 | Grison et al. |
| 6,281,301 B1 | 8/2001 | Morini et al. |
| 6,294,497 B1 | 9/2001 | Morini et al. |
| 6,313,238 B1 | 11/2001 | Morini et al. |
| 6,362,124 B1 | 3/2002 | Kuribayashi et al. |
| 6,395,670 B1 | 5/2002 | Morini et al. |
| 6,436,864 B1 | 8/2002 | Tagge |
| 6,552,136 B1 | 4/2003 | Ota et al. |
| 6,605,562 B1 | 8/2003 | Morini et al. |
| 6,689,849 B1 | 2/2004 | Sadashima et al. |
| 6,716,939 B2 | 4/2004 | Morini et al. |
| 6,770,586 B2 | 8/2004 | Tashino et al. |
| 6,818,583 B1 | 11/2004 | Morini et al. |
| 6,825,309 B2 * | 11/2004 | Morini ................... C08F 10/00 502/103 |
| 7,009,015 B2 | 3/2006 | Evain et al. |
| 7,022,640 B2 | 4/2006 | Morini et al. |
| 7,049,377 B1 | 5/2006 | Morini et al. |
| 7,202,314 B2 | 4/2007 | Morini et al. |
| 7,208,435 B2 | 4/2007 | Hosaka et al. |
| 7,223,712 B2 | 5/2007 | Morini et al. |
| 7,244,794 B2 | 7/2007 | Park et al. |
| 7,276,463 B2 | 10/2007 | Sugano et al. |
| 7,351,778 B2 | 4/2008 | Gao et al. |
| 7,371,802 B2 | 5/2008 | Gulevich et al. |
| 7,491,781 B2 | 2/2009 | Uhrhammer et al. |
| 7,544,748 B2 | 6/2009 | Gulevich et al. |

(Continued)

*Primary Examiner* — Catherine S Branch
(74) *Attorney, Agent, or Firm* — Jones Walker LLP

(57) ABSTRACT

Disclosed are a catalyst component for olefin polymerization comprising titanium, magnesium, a halogen, internal donors, in combination with a silane and oxalic acid diamides of the following formula:

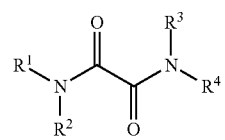

An olefin polymerization catalyst system consisting of the solid catalyst component, an organoaluminum compound, and an optional external electron donor compound is also disclosed. Employment of both oxalic acid diamides and silane component in the presence of internal electron donors as an elements of solid Ziegler-Natta type catalyst composition enhances stereo-specificity while maintaining excellent catalyst activity and hydrogen response, in which the modified catalyst composition produces polypropylene with good productivity and higher stereo-specificity than catalyst composition without such modification.

14 Claims, No Drawings

(56) References Cited

U.S. PATENT DOCUMENTS

| | | |
|---|---|---|
| 7,619,049 B1 | 11/2009 | Fang et al. |
| 7,674,741 B2 | 3/2010 | Gulevich et al. |
| 7,674,943 B2 | 3/2010 | Uhrhammer et al. |
| 7,790,819 B1 | 9/2010 | Fang et al. |
| 7,888,437 B2 | 2/2011 | Matsunaga et al. |
| 7,888,438 B2 | 2/2011 | Matsunaga et al. |
| 7,935,766 B2 | 5/2011 | Sheard et al. |
| 7,964,678 B2 | 6/2011 | Wang et al. |
| 8,003,558 B2 | 8/2011 | Chang |
| 8,003,559 B2 | 8/2011 | Chang |
| 8,088,872 B2 | 1/2012 | Chen et al. |
| 8,211,819 B2 | 7/2012 | Chang |
| 8,222,357 B2 | 7/2012 | Chen |
| 8,227,370 B2 | 7/2012 | Chang |
| 8,236,908 B2 | 8/2012 | Hirahata et al. |
| 8,247,341 B2 | 8/2012 | Gonzalez et al. |
| 8,247,504 B2 | 8/2012 | Yano et al. |
| 8,263,520 B2 | 9/2012 | Coalter, III et al. |
| 8,263,692 B2 | 9/2012 | Sheard et al. |
| 8,288,304 B2 | 10/2012 | Chen et al. |
| 8,288,585 B2 | 10/2012 | Chen et al. |
| 8,288,606 B2 | 10/2012 | Uhrhammer et al. |
| 8,318,626 B2 | 11/2012 | Chang |
| 8,383,540 B2 | 2/2013 | Chen et al. |
| 8,536,290 B2 | 9/2013 | Chen et al. |
| 8,569,195 B2 | 10/2013 | Chang |
| 8,575,283 B1 | 11/2013 | Fang et al. |
| 8,604,146 B2 | 12/2013 | Chen et al. |
| 8,614,162 B2 | 12/2013 | Coalter, III |
| 8,633,126 B2 | 1/2014 | Coalter, III et al. |
| 8,648,001 B2 | 2/2014 | Hosaka et al. |
| 8,664,142 B2 | 3/2014 | Kim et al. |
| 8,680,222 B2 | 3/2014 | Standaert et al. |
| 8,692,927 B2 | 4/2014 | Pease et al. |
| 8,716,514 B2 | 5/2014 | Ernst et al. |
| 8,742,040 B2 | 6/2014 | Matsunaga et al. |
| 2010/0190942 A1* | 7/2010 | Hosaka .............. C07F 7/10 526/128 |
| 2013/0131290 A1* | 5/2013 | Morini .............. C08F 10/06 526/111 |
| 2015/0152204 A1 | 6/2015 | Guo et al. |
| 2016/0115260 A1* | 4/2016 | Kong .............. C08F 110/06 526/123.1 |

\* cited by examiner

CATALYST SYSTEM FOR ENHANCED STEREO-SPECIFICITY OF OLEFIN POLYMERIZATION AND METHOD FOR PRODUCING OLEFIN POLYMER

BACKGROUND

1. Field of the Invention

The present invention relates to a polymerization catalyst component comprising magnesium, titanium, electron donors, oxalic acid diamides, and silane compounds, to methods of making such polymerization catalyst systems, and to polymerization processes for producing polyolefins, particularly polypropylene, which exhibits substantially enhanced stereo-specificity.

2. Description of the Related Art

Ziegler-Natta catalyst systems for polyolefin polymerization are well known in the art. Commonly, these systems are composed of a solid Ziegler-Natta catalyst component and a co-catalyst component, usually an organoaluminum compound. To increase the activity and stereo-specificity of the catalyst system for the polymerization of α-olefins, electron donating compounds have been incorporated into the Ziegler-Natta catalyst component during catalyst preparation, which is used as an internal electron donor, and/or it can be charged into the polymerization reactor during the polymerization process, which is used as an external electron donor in conjunction with the solid Ziegler-Natta catalyst component and the co-catalyst component.

Common internal electron donor compounds, which are incorporated in the solid Ziegler-Natta catalyst component during preparation of such component, are known in the art and include ethers, ketones, amines, alcohols, heterocyclic organic compounds, phenols, phosphines, and silanes. It is well known in the art that polymerization activity, as well as stereo-regularity, molecular weight, and the molecular weight distribution of the resulting polymer depend on the molecular structure of the internal electron donor employed. Therefore, in order to improve the polymerization process and the properties of the resulting polymer, there has been an effort and desire to develop various internal electron donors. Examples of such internal electron donor compounds and their use as a component of the catalyst system are described in U.S. Pat. Nos. 4,107,414; 4,186,107; 4,226,963; 4,347,160; 4,382,019; 4,435,550; 4,465,782; 4,522,930; 4,530,912; 4,532,313; 4,560,671; 4,657,882; 5,208,302; 5,902,765; 5,948,872; 6,048,818; 6,121,483; 6,281,301; 6,294,497; 6,313,238; 6,395,670; 6,436,864; 6,605,562; 6,716,939; 6,770,586; 6,818,583; 6,825,309; 7,022,640; 7,049,377; 7,202,314; 7,208,435; 7,223,712; 7,351,778; 7,371,802; 7,491,781; 7,544,748; 7,674,741; 7,674,943; 7,888,437; 7,888,438; 7,935,766; 7,964,678; 8,003,558; 8,003,559; 8,088,872; 8,211,819; 8,222,357; 8,227,370; 8,236,908; 8,247,341; 8,263,520; 8,263,692; 8,288,304; 8,288,585; 8,288,606; 8,318,626; 8,383,540; 8,536,290; 8,569,195; 8,575,283; 8,604,146; 8,633,126; 8,692,927; 8,664,142; 8,680,222; 8,716,514; and 8,742,040, which are incorporated by reference herein.

Acceptable external electron donors include organic compounds containing O, Si, N, S, and/or P. Such compounds include organic acids, organic acid esters, organic acid anhydrides, ethers, ketones, alcohols, aldehydes, silanes, amides, amines, amine oxides, thiols, various phosphorus acid esters and amides, etc. Preferred external electron donors are organosilicon compounds containing Si—O—C and/or Si—N—C bonds, having silicon as the central atom. Such compounds are described in U.S. Pat. Nos. 4,472,524; 4,473,660; 4,560,671; 4,581,342; 4,657,882; 5,106,807; 5,407,883; 5,684,173; 6,228,961; 6,362,124; 6,552,136; 6,689,849; 7,009,015; 7,244,794; 7,276,463; 7,619,049; 7,790,819; 8,247,504; 8,648,001; and 8,614,162, which are incorporated by reference herein.

Zeigler-Natta catalyst systems have been employed to produce polyolefins for various applications, and some application areas, such as impact polypropylene-based polymer area, require a higher stereo-specific catalyst system than what can be achieved via incumbent catalyst systems employing internal donors such as alkyl phthalate esters, 1,3-diethers, succinate and malonic acid ester compounds. Recently, U.S. Pat. No. 9,045,572 discloses a method for preparing a solid catalyst by employing bicycloalkanedicarboxylate or bicycloalkenedicarboxylate and silane compounds such as tetraethoxysilane (TEOS) as an internal electron donor during synthesis of the catalyst component, which can prepare polypropylene having better stereoregularity with a high production yield. U.S. Publ. App. No. 2015/0152204 teaches a catalyst for olefin polymerization comprising a titanium compound, a silane compound, a magnesium compound, a phosphorus compound, and phthalate-based alkyl esters as an internal donor, which shows improved activity of the catalyst system.

However, the isotacticity of propylene polymer is still insufficient, and particularly in the field where highly crystalline polymers are required such as for propylene impact copolymers, further improvement is desirable. As such, there is a desire for developing a catalyst system which can provide higher isotacticity of the propylene polymer.

SUMMARY OF THE INVENTION

The present invention discloses a Ziegler-Natta catalyst system employing internal electron donors in combination with oxalic acid diamide and silane compounds, where in the internal donors can be chosen from incumbent electron donors widely used in propylene polymerization catalyst such as phthalate, diether, malonate, succinate compounds. According to certain teachings of the present invention, a catalyst system is provided which can produce highly stereospecific polypropylene to fulfill the aforementioned requirements.

In accordance with various aspects thereof, the present invention relates to a catalyst system for the polymerization or co-polymerization of alpha-olefins comprising a modified solid Ziegler-Natta type catalyst component, a co-catalyst component, and optionally an external electron donor component. The solid Ziegler-Natta type catalyst component of the present invention contains oxalic acid diamide and silane compounds in combination with internal electron donors, wherein the oxalic acid diamides according to the present invention are represented by Formula I:

[Formula I]

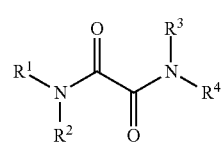

wherein $R^1$, $R^2$, $R^3$, and $R^4$ are independently selected from hydrogen, an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing a hydrocarbon group of 1 to 20 carbon atoms, wherein two or more of $R^1$, $R^2$, $R^3$, and $R^4$ may be linked to form one or more saturated or unsaturated monocyclic or polycyclic rings.

Silane compounds in the catalyst system according to the present invention are represented by

[Formula II]

wherein $R^5$, $R^6$, R, R' are independently selected from hydrogen, an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing a hydrocarbon group of 1 to 20 carbon atoms; wherein two or more of $R^5$, $R^6$, R, R' may be linked to form one or more saturated or unsaturated monocyclic or polycyclic rings; wherein X and Y are independently selected from O, S, $NR_a$, and $NR_b$, wherein $R_a$, $R_b$ are hydrocarbon groups; wherein n and m are $0 \leq n, m \leq 2$; wherein p is $1 \leq p \leq 4$; and wherein $0 \leq (m+n+p) \leq 4$.

Preferred examples of suitable oxalic acid diamides of Formula I include, but are not limited to:

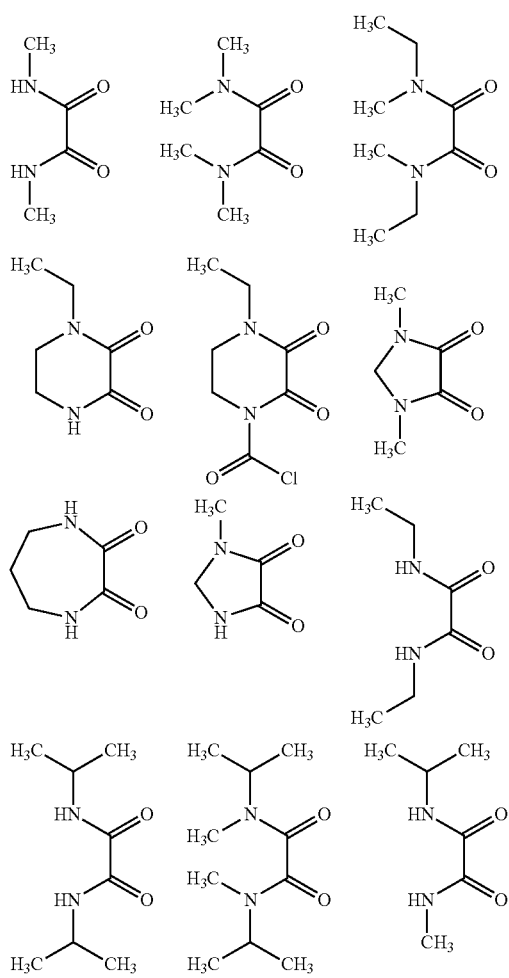

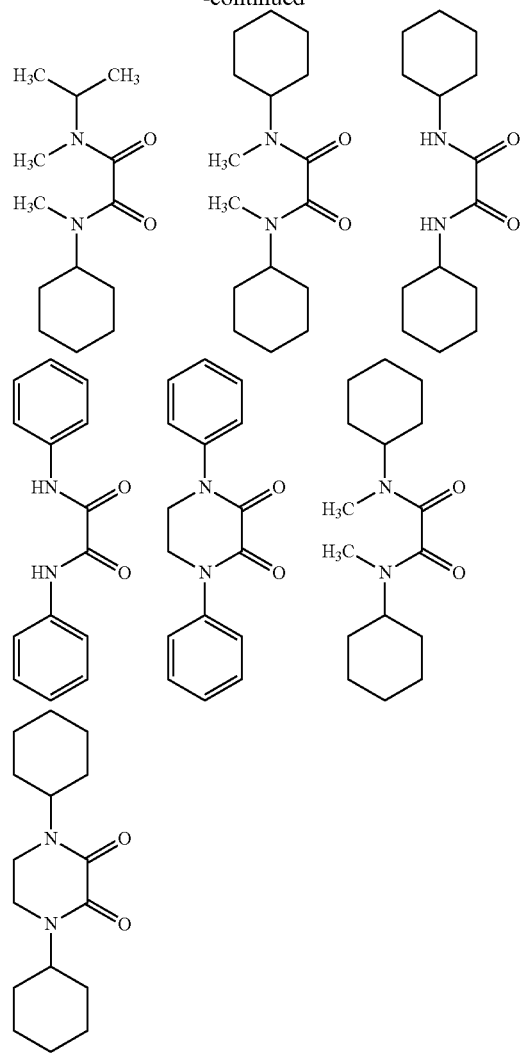

Specific examples of silane compounds of Formula II include: tetraethylorthosilicate, trimethylmethoxysilane, diphenyldimethoxysilane, cyclohexylmethyldimethoxysilane, diisopropyldimethoxysilane, dicyclopentyldimethoxysilane, isobutyltriethoxysilane, vinyltrimethoxysilane, dicyclohexyldimethoxysilane, 3-tert-Butyl-2-isobutyl-2methoxy-[1,3,2]oxazasilolidine, diisopropyltetrahydrofurylsilane, 3-tert-Butyl-2-cyclopentyl-2-methoxy-[1,3,2]oxazasilolidine, 2-bicyclo[2.2.1]hept-5-en-2-yl-3-tert-butyl-2-methoxy-[1,3,2]oxazasilolidine, 3-tert-Butyl-2,2-diethoxy-[1,3,2]oxazasilolidine, 4,9-Di-tert-butyl-1,6-dioxa-4,9-diaza-5-sila-spiro[4.4]nonane, bis(perhydroisoquinolino) dimethoxysilane.

DESCRIPTION OF PREFERRED EMBODIMENTS

The present invention relates to the catalyst system employing oxalic acid diamides and silane compounds in conjunction with internal electron donors for polymerization catalyst systems, to methods of making the polymerization catalyst systems, and to polymerization processes to produce polyolefins, particularly polypropylene, which exhibit substantially higher sterospecificity than the catalyst system employing incumbent internal donors such as phthalate, diethers, malonates, or succinates.

In accordance with certain embodiments of the present invention, a combination of oxalic acid diamides and silane compounds, which are useful in polymerization catalyst systems for the production of polyolefins, particularly polypropylene, are disclosed. Polymerization catalyst systems employing both oxalic acid diamide and silane compounds of the present invention may additionally include an internal electron donor, an external electron donor, or both an internal electron donor and an external electron donor.

According to certain aspects of the present invention, the oxalic acid diamides that may be used in polymerization catalyst systems are represented by Formula I:

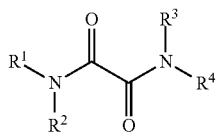

[Formula I]

wherein $R^1$, $R^2$, $R^3$, and $R^4$ are independently selected from hydrogen, an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing a hydrocarbon group of 1 to 20 carbon atoms, wherein two or more of $R^1$, $R^2$, $R^3$, and $R^4$ may be linked to form one or more saturated or unsaturated monocyclic or polycyclic rings.

Preferred examples of suitable oxalic acid diamides of Formula I include, but are not limited to:

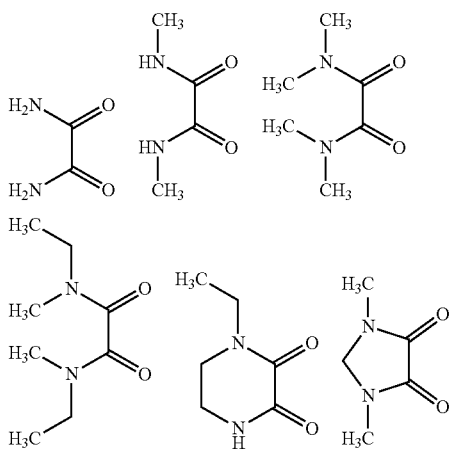

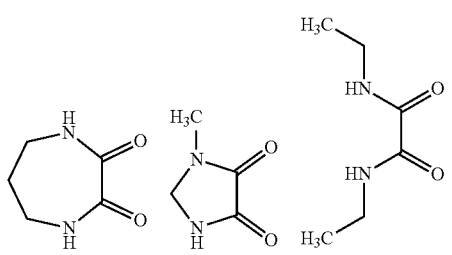

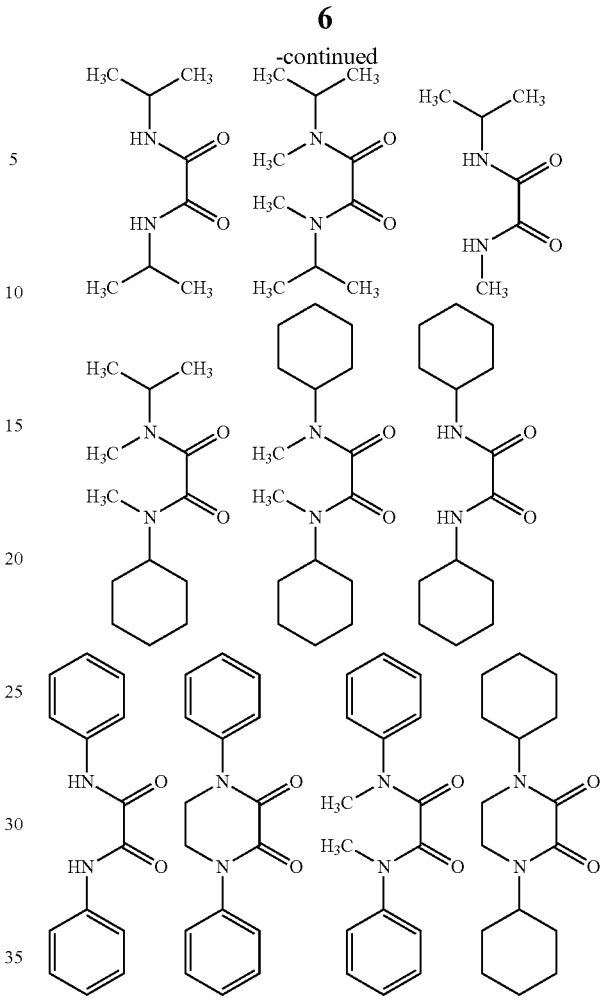

The oxalic acid diamides of the present invention may be used as a component in Ziegler-Natta type catalyst systems. Except for the inclusion of the oxalic acid diamides of the present invention, the Ziegler-Natta type catalyst systems, and methods for making such catalyst systems, are not generally limited.

According to certain aspects of the present invention, silane compounds that may be used in polymerization catalyst systems are represented by Formula II:

$$R^5{}_m R^6{}_n Si(XR)_p(YR')_{4-(m+n+p)}$$ [Formula II]

wherein $R^5$, $R^6$, R, R' are independently selected from hydrogen, an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing a hydrocarbon group of 1 to 20 carbon atoms; wherein two or more of $R^5$, $R^6$, R, R' may be linked to form one or more saturated or unsaturated monocyclic or polycyclic rings; wherein X and Y are independently selected from O, S, $NR_a$, and $NR_b$, wherein $R_a$, $R_b$ are hydrocarbon groups; wherein n and m are $0 \le n, m \le 2$; wherein p is $1 \le p \le 4$; and wherein $0 \le (m+n+p) \le 4$.

Preferred examples of suitable silane compounds of Formula II include, but are not limited to: tetramethoxysilane, tetraethoxysilane, tetrapropoxysilane, tetrabutoxysilane, n-propyltrimethoxysilane, di-n-propyldimethoxysilane, iso-propyltrimethoxysilane, di-iso-propyldimethoxysilane, n-butyltrimethoxysilane, di-n-butyldimethoxysilane, iso-butyltrimethoxysilane, di-iso-butyldimethoxysilane, tert-butyltrimethoxysilane, di-tert-butyldimethoxysilane, n-pentyltrimethoxysilane, di-n-pentyldimethoxysilane, cyclopentyltrimethoxysilane, dicyclopentyldimethoxysilane, cyclopentylmethyldimethoxysilane, cyclopentylethyldimethoxysilane, cyclopentylpropyldimethoxysilane, cyclohexyltrimethoxysilane, dicyclohexyldimethoxysilane, dicyclohexylmethyldimethoxysilane, cyclohexylethyldimethoxysilane, cyclohexyl propyldimethoxysilane, cycloheptyltrimethoxysilane, dicycloheptyldimethoxysilane, cycloheptylmethyldimethoxysilane, cyclheptyldimethoxysilane, cyclheptylpropyldimethoxysilane, phenyltrimethoxysilane, diphenyldimethoxysilane, phenylmethyldimethoxysilane, phenylethyldimethoxysilane, phenylpropyldimethoxysilane, n-prop yltriethoxysilane, di-n-propyldiethoxysilane, isopropyltriethoxysilane, di-iso-propyldiethoxysilane, n-butyltriethoxysilane, di-n-butyldiethoxysilane, iso-butyltriethoxysilane, di-iso-butyldiethoxysilane, tert-butyltriethoxysilane, ditert-butyldiethoxysilane, n-pentyltriethoxysilane, di-n-pentyldiethoxysilane, cyclopentyltriethoxysilane, dicyclopentyldiethoxysilane, cyclopentylmethyldiethoxysilane, cyclopentylethyldiethoxysilane, cyclopentylpropyldiethoxysilane, cyclohexyltriethoxysilane, dicyclohexyldiethoxysilane, cyclohexylmethyldiethoxysilane, cyclohexylethyldiethoxysilane, cyclohexylpropyldiethoxysilane, cycloheptyltriethoxysilane, dicycloheptyldiethoxysilane, cycloheptylmethyldiethoxysilane, cycloheptylethyldiethoxysilane, cycloheptylpropyldiethoxysilane, phenyltriethoxysilane, diphenyldiethoxysilane, phenylmethyldiethoxysilane, phenylethyldiethoxysilane, phenylpropyldiethoxysilane, and diisopropyltetrahydrofurylsilane.

Ziegler-Natta type catalyst systems that may be used in accordance with the present invention comprise (a) a solid Ziegler-Natta type catalyst component, (b) a co-catalyst component, and optionally (c) one or more external electron donors. In accordance with certain embodiments of the present invention, a combination of both oxalic acid diamide and silane compounds are used in addition to the internal electron donor typically employed in the Ziegler-Natta type catalyst system.

A preferred solid Ziegler-Natta type catalyst component (a) includes solid catalyst components comprising a titanium compound having at least a Ti-halogen bond and an internal electron donor compound supported on an anhydrous magnesium-dihalide support. Such preferred solid Ziegler-Natta type catalyst component (a) include solid catalyst components comprising a titanium tetrahalide. A preferred titanium tetrahalide is $TiCl_4$. Alkoxy halides may also be used solid Ziegler-Natta type catalyst component (a).

The internal electron donor compounds for the preparation of solid Ziegler-Natta type catalyst component (a) can be chosen from commonly used internal electron donors such as aliphatic/aromatic esters, phthalic esters, aliphatic/aromatic 1,3-diethers, malonic esters, succinic esters, carbonate compounds. In some embodiments, internal electron donors can be chosen from di-isobutyl phthalate, di-n-butyl phthalate, di-iso-octyl phthalate, 1,3-dipentyl phthalate, ethylbenzoate, ethyl benzoate, n-butyl benzoate, methyl-p-toluate, and methyl-p-methoxybenzoate and diisobutyl-phthalate, diethyldiisobutylmalonate, diethylisopropylmalonate, diethylphenylmalonate, dimethyldiisobutylmalonate, dimethylphenylmalonate, 9,9-bis(methoxymethyl)fluorene; 9,9-bis(methoxymethyl)-2,3,6,7-tetramethylfluorene; 9,9-bis(methoxymethyl)-2,3,4,5,6,7-hexafluorofluorene; 9,9-bis(methoxymethyl)-2,3-benzofluorene; 9,9-bis(methoxymethyl)-2,3,6,7-dibenzofluorene; 9,9-bis(methoxymethyl)-2,7-diisopropylfluorene; 9,9-bis(methoxymethyl)-1,8-dichlorofluorene; 9,9-bis(methoxymethyl)-2,7-dicyclopentylfluorene; 9,9-bis(methoxymethyl)-1,8-difluorofluorene; 9,9-bis(methoxymethyl)-1,2,3,4-tetrahydrofluorene; 9,9-bis(methoxymethyl)-1,2,3,4,5,6,7,8-octahydrofluorene; 9,9-bis(methoxymethyl)-4-tert-butylfluorene, diethyl 2,3-bis(trimethylsilyl)succinate, diethyl 2,3-bis(2-ethylbutyl)succinate, diethyl 2,3-dibenzylsuccinate, diethyl 2,3-diisopropylsuccinate, diisobutyl 2,3-diisopropylsuccinate, diethyl 2,3-bis(cyclohexylmethyl)succinate, diethyl 2,3-diisobutylsuccinate, diethyl 2,3-dineopentylsuccinate, diethyl 2,3-dicyclopentylsuccinate, diethyl 2,3-dicyclohexylsuccinate, Other common internal electron donors, including alkyl or alkyl-aryl ethers, polyethers, ketones, mono- or polyamines, heterocyclic organic compounds, aldehydes, and P-compounds, such as phosphines and phosphoramides, may also be used.

Acceptable anhydrous magnesium dihalides forming the support of the solid Ziegler-Natta type catalyst component (a) are the magnesium dihalides in active form that are well known in the art. Such magnesium dihalides may be pre-activated, may be activated in situ during the titanation, may be formed in-situ from a magnesium compound, which is capable of forming magnesium dihalide when treated with a suitable halogen-containing transition metal compound, and then activated. Preferred magnesium dihalides are magnesium dichloride and magnesium dibromide. The water content of the dihalides is generally less than 1% by weight.

The solid Ziegler-Natta type catalyst component (a) may be made by various methods. One such method consists of co-grinding the magnesium dihalide and the internal electron donor compound until the product shows a surface area higher than 20 $m^2/g$ and thereafter reacting the ground product with the Ti compound. Other methods of preparing solid Ziegler-Natta type catalyst component (a) are disclosed in U.S. Pat. Nos. 4,220,554; 4,294,721; 4,315,835; 4,330,649; 4,439,540; 4,816,433; and 4,978,648. These methods are incorporated herein by reference.

In a typical modified solid Ziegler-Natta type catalyst component (a), the molar ratio between the magnesium dihalide and the halogenated titanium compound is between 1 and 500, the molar ratio between said halogenated titanium compound and the internal electron donor is between 0.1 and 50, and the molar ratio between said internal electron donor and the oxalic acid diamide modifier is between 0.1 and 100.

Preferred co-catalyst component (b) includes aluminum alkyl compounds, which can be represented by the formula II;

$$R_nAlQ_{3-n} \qquad \text{[Formula II]}$$

wherein $R_n$ represents an alkyl group having 1 to 6 carbon atoms, Q represents a hydrogen or a halogen atom, and n represents a real number that satisfies $0 < n \leq 3$.

Acceptable aluminum alkyl compounds include aluminum trialkyls, such as aluminum triethyl, aluminum triisobutyl, and aluminum triisopropyl. Other acceptable aluminum alkyl compounds include aluminum-dialkyl hydrides, such as aluminum-diethyl hydrides. Other acceptable co-catalyst component (b) includes compounds containing two or more aluminum atoms linked to each other through hetero-atoms, such as:

$(C_2H_5)_2Al-O-Al(C_2H_5)_2$ $(C_2H_5)_2Al-N(C_6H_5)-Al(C_2H_5)_2$; and $(C_2H_5)_2Al-O-SO_2-O-Al(C_2H_5)_2$.

Acceptable external electron donor component (c) is organic compounds containing O, Si, N, S, and/or P. Such compounds include organic acids, organic acid esters, organic acid anhydrides, ethers, ketones, alcohols, aldehydes, silanes, amides, amines, amine oxides, thiols, various phosphorus acid esters and amides, etc. Preferred component (c) is organosilicon compounds containing Si—O—C and/or Si—N—C bonds. Specific examples of such organosilicon compounds include, but are not limited to: trimethylmethoxysilane, diphenyldimethoxysilane, cyclohexylmethyldimethoxysilane, diisopropyldimethoxysilane, dicyclopentyldimethoxysilane, isobutyltriethoxysilane, vinyltrimethoxysilane, dicyclohexyldimethoxysilane, 3-tert-Butyl-2-isobutyl-2methoxy-[1,3,2]oxazasilolidine, 3-tert-Butyl-2-cyclopentyl-2-methoxy-[1,3,2]oxazasilolidine, 2-Bicyclo[2.2.1]hept-5-en-2-yl-3-tert-butyl-2-methoxy-[1,3,2]oxazasilolidine, 3-tert-Butyl-2,2-diethoxy-[1,3,2]oxazasilolidine, 4,9-Di-tert-butyl-1,6-dioxa-4,9-diaza-5-silaspiro[4.4]nonane, and bis(perhydroisoquinolino)dimethoxysilane. Mixtures of organic electron donors may also be used.

The olefin polymerization processes that may be used in accordance with the present invention are not generally limited. For example, the catalyst components (a), (b) and (c), when employed, may be added to the polymerization reactor simultaneously or sequentially. It is preferred to mix components (b) and (c) first and then contact the resultant mixture with component (a) prior to the polymerization.

The olefin monomer may be added prior to, with, or after the addition of the Ziegler-Natta type catalyst system to the polymerization reactor. It is preferred to add the olefin monomer after the addition of the Ziegler-Natta type catalyst system.

The molecular weight of the polymers may be controlled in a known manner, preferably by using hydrogen. With the catalysts produced according to the present invention, molecular weight may be suitably controlled with hydrogen when the polymerization is carried out at relatively low temperatures, e.g., from about 30° C. to about 105° C. This control of molecular weight may be evidenced by a measurable positive change of the Melt Flow Rate.

The polymerization reactions may be carried out in slurry, liquid or gas phase processes, or in a combination of liquid and gas phase processes using separate reactors, all of which may be done either by batch or continuously. The polyolefin may be directly obtained from gas phase process, or obtained by isolation and recovery of solvent from the slurry process, according to conventionally known methods.

There are no particular restrictions on the polymerization conditions for production of polyolefins by the method of this invention, such as the polymerization temperature, polymerization time, polymerization pressure, monomer concentration, etc. The polymerization temperature is generally from 40-90° C. and the polymerization pressure is generally 1 atmosphere or higher.

The Ziegler-Natta type catalyst systems of the present invention may be pre-contacted with small quantities of olefin monomer, well known in the art as pre-polymerization, in a hydrocarbon solvent at a temperature of 60° C. or lower for a time sufficient to produce a quantity of polymer from 0.5 to 3 times the weight of the catalyst. If such a pre-polymerization is done in liquid or gaseous monomer, the quantity of resultant polymer is generally up to 1000 times the catalyst weight.

The Ziegler-Natta type catalyst systems of the present invention are useful in the polymerization of olefins, including but not limited to homo-polymerization and copolymerization of alpha olefins. Suitable α-olefins that may be used in a polymerization process in accordance with the present invention include olefins of the general formula $CH_2$=CHR, where R is H or $C_{1-10}$ straight or branched alkyl, such as ethylene, propylene, butene-1, pentene-1,4-methylpentene-1 and octene-1. While the Ziegler-Natta type catalyst systems of the present invention may be employed in processes in which ethylene is polymerized, it is more desirable to employ the Ziegler-Natta type catalyst systems of the present invention in processes in which polypropylene or higher olefins are polymerized. Processes involving the homo-polymerization or copolymerization of propylene are preferred.

EXAMPLES

In order to provide a better understanding of the foregoing, the following non-limiting examples are offered. Although the examples may be directed to specific embodiments, they are not to be viewed as limiting the invention in any specific respect. The activity values (AC) are based upon grams of polymer produced per gram of solid catalyst component used.

The following analytical methods are used to characterize the polymer.

Heptane Insolubles (% HI): The weight percent (wt %) of residuals of polypropylene sample after extracted with boiling heptane for 8 hours.

Melt Flow rate (MI): ASTM D-1238, determined at 230° C. under the load of 2.16 kg.

Magnesium ethoxide (98%), anhydrous toluene (99.8%), $TiCl_4$ (99.9%), anhydrous n-heptane (99%), diisobutyl phthalate (99%), cyclohexyl(dimethoxy)methylsilane (C-donor, ≥99%) and triethylaluminum (93%) were all purchased from Sigma-Aldrich Co. of Milwaukee, Wis., USA. Diisopropyldimethoxysilane (P-donor) and dicyclopentyldimethoxysilane (D-donor) were purchased from Gelest, Inc. of Morrisville, Pa., USA. Diethyldiisobutylmalonate (98%) and 1-ethyl-2,3-piperazinedione (used as Modifier, 98%) were purchase from TCI America. Unless otherwise indicated, all reactions were conducted under an inert atmosphere.

Example 1

(A) the Preparation of a Solid Catalyst Component

A three neck 250 ml flask equipped with fritted filter disk and mechanical stirrer, which is thoroughly purged with nitrogen, was charged with 87 mmol of magnesium ethoxide and 80 ml of anhydrous toluene to form a suspension. To the suspension was added 1.5 mmol of 1-ethyl-2,3-piperazinedione and injected 20 ml of $TiCl_4$ and was then heated up to a temperature of 90° C. 8.5 mmol of diisobutyl phthalate (DIBP) as internal electron donor and 1.5 mmol of diisopropyltetrahydrofurylmethoxysilane were added thereto, followed by heating up to 110° C. with agitation at that temperature for 2 hours. After the completion of the reaction, the resulting solid was filtered and washed twice with 100 ml of anhydrous toluene at 90° C., and 80 ml of fresh anhydrous toluene and 20 ml of $TiCl_4$ were added thereto for reacting with agitation at 110° C. for two additional hours. After the completion of the reaction, the solid was filtered and washed 7 times with 100 ml of anhydrous n-heptane at 90° C. and was dried under a reduced pressure to obtain a solid composition (A-1).

(B) Propylene Bulk Polymerization

Propylene polymerization was conducted in a bench scale 1 gallon reactor per the following procedure. The reactor was first preheated to at least 100° C. with a nitrogen purge to remove residual moisture and oxygen. The reactor was thereafter cooled to 50° C. Under nitrogen, 14 ml of triethylaluminum (0.58M, in hexanes), 0.25 mmol of diisopropyldimethoxysilane was charged. After addition of hydrogen and 2.0 liter of liquefied propylene, temperature was raised to 70° C., and then 15 mg of solid catalyst component prepared above was flushed with propylene to start polymerization. The polymerization was conducted for 1 hour at 70° C. The polymer was evaluated for melt flow rate (MFR), heptane insoluble (HI %). The activity of catalyst (AC) was also measured. The results are shown in TABLE 1.

Example 2

(A) the Preparation of a Solid Catalyst Component (A-2)

Preparation of solid catalyst component was carried out in the same way as Example 1, except that instead of 1.5 mmol of diisopropyltetrahydrofurylmethoxysilane, 3.0 mmol of dicyclopentyl(dimethoxy)silane (D-donor) were added to make catalyst component (A-2)

(B) Propylene Bulk Polymerization

Propylene polymerization was conducted in a bench scale 1 gallon reactor per the following procedure. The reactor was first preheated to at least 100° C. with a nitrogen purge to remove residual moisture and oxygen. The reactor was thereafter cooled to 50° C. Under nitrogen, 14 ml of triethylaluminum (0.58M, in hexanes), 0.25 mmol of diisopropyldimethoxysilane was charged. After addition of hydrogen and 2.0 liter of liquefied propylene, temperature was raised to 70° C., and then 15 mg of solid catalyst component prepared above (A-2) was flushed with propylene to start polymerization. The polymerization was conducted for 1 hour at 70° C. The polymer was evaluated for melt flow rate (MFR), heptane insoluble (HI %). The activity of catalyst (AC) was also measured. The results are shown in TABLE 1.

Comparative Example 1

(A) the Preparation of a Solid Catalyst Component (C-1)

Preparation of solid catalyst component (C-1) was carried out in the same way as Example 1, except that 10.0 mmol of diisobutyl phthalate (DIBP) was added as internal electron donor and 1.5 mmol of diisopropyltetrahydrofurylmethoxysilane, or 1.5 mmol of 1-ethyl-2,3-piperazinedione was not added.

(B) Propylene Bulk Polymerization

Propylene polymerization using catalyst component (C-1) was carried out in the same manner as described in Example 1. The results are shown in TABLE 1.

Comparative Example 2

(A) The Preparation of a Solid Catalyst Component (C-2)

Preparation of solid catalyst component (C-2) was carried out in the same way as Example 1, except that 1.5 mmol of diisopropyltetrahydrofurylmethoxysilane was not added.

(B) Propylene Bulk Polymerization

Propylene polymerization using catalyst component (C-2) was carried out in the same manner as described in Example 1. The results are shown in TABLE 1.

Example 3

(A) The Preparation of a Solid Catalyst Component (A-3)

A three neck 250 ml flask equipped with magnetic stirring bar, which is thoroughly purged with nitrogen, was charged with 61 mmol of magnesium ethoxide and 70 ml of anhydrous toluene to form a suspension. To the suspension was added 1.5 mmol of 1-ethyl-2,3-piperazinedione and injected 15 ml of $TiCl_4$ and was then heated up to a temperature of 90° C. 3.0 mmol of diethylisopropylmalonate (DEIPM) and 3.0 mmol of diethylphenylmalonate (DEPHM) as internal electron donor mixture and 5.4 mmol of tetraethylorthosilicate were added thereto, followed by heating up to 110° C. with agitation at that temperature for 2 hours. After the completion of the reaction, the resulting solid was settled down and supernatant liquid portion was decanted and washed twice with 100 ml of anhydrous toluene at 90° C., and 70 ml of fresh anhydrous toluene and 20 ml of $TiCl_4$ were added thereto for reacting with agitation at 110° C. for two additional hours. After the completion of the reaction, the solid was filtered and washed 4 times with 100 ml of anhydrous n-heptane at 90° C. and was dried under a reduced pressure to obtain a solid composition (A-3).

(B) Propylene Slurry Polymerization

Propylene polymerization was conducted in another bench scale 2-liter reactor per the following procedure.

The reactor was first preheated to at least 100° C. with a nitrogen purge to remove residual moisture and oxygen. The reactor was thereafter cooled to 50° C. Under nitrogen, 1 liter dry heptane was introduced into the reactor. When reactor temperature was about 50° C., 4.3 ml of triethylaluminum (0.58M, in hexanes), 0.4-1.6 ml of dicyclopentyl (dimethoxy)silane (D-donor) (0.5 M in heptane) or 0.4-1.6 ml of diisopropyl(dimethoxy)silane (P-donor) (0.5 M in heptane), and then 30 mg of the solid catalyst component (A-3) prepared above were added to the reactor. The temperature of the reactor was heated to 50° C. and 16 psi of hydrogen in a 150 ml vessel was flushed into the reactor with propylene.

The reactor temperature was then raised to 70° C., or 80° C. The total reactor pressure was raised to and controlled at 90 psig by continually introducing propylene into the reactor and the polymerization was allowed to proceed for 1 hour. After polymerization, the reactor was vented to reduce the pressure to 0 psig and the reactor temperature was cooled to 50° C.

The reactor was then opened. 500 ml methanol was added to the reactor and the resulting mixture was stirred for 5 minutes then filtered to obtain the polymer product. The obtained polymer was vacuum dried at 80° C. for 6 hours. The polymer was evaluated for melt flow rate (MFR), heptane insoluble (HI %). The activity of catalyst (AC) was also measured. The results are shown in TABLE 2.

Comparative Example 3

(A) The Preparation of a Solid Catalyst Component (C-3)

Preparation of solid catalyst component (C-3) was carried out in the same way as Example 4, except that 1.5 mmol of diisopropyltetrahydrofurylmethoxysilane, or 1.5 mmol of 1-ethyl-2,3-piperazinedione were not added.

(B) Propylene Slurry Polymerization

Propylene polymerization using catalyst component (C-3) was carried out in the same manner as described in Example 3. The results are shown in TABLE 2.

Comparative Example 4

(A) The Preparation of a Solid Catalyst Component (C-4)

Preparation of solid catalyst component (C-4) was carried out in the same way as Example 3, except that 1.5 mmol of diisopropyltetrahydrofurylmethoxysilane was not added.

(B) Propylene Slurry Polymerization

Propylene polymerization using catalyst component (C-4) was carried out in the same manner as described in Example 3. The results are shown in TABLE 2.

Comparative Example 5

(A) The Preparation of a Solid Catalyst Component (C-5)

A three neck 250 ml flask equipped with magnetic stirring bar, which is thoroughly purged with nitrogen, was charged with 61 mmol of magnesium ethoxide and 70 ml of anhydrous toluene to form a suspension. To the suspension was injected 15 ml of $TiCl_4$ and was then heated up to a temperature of 90° C. 7.0 mmol of DiBP (diisobutylphthalate) as internal electron donor was added thereto, followed by heating up to 110° C. with agitation at that temperature for 2 hours. After the completion of the reaction, the resulting solid was settled down and supernatant liquid portion was decanted and washed twice with 100 ml of anhydrous toluene at 90° C., and 70 ml of fresh anhydrous toluene and 20 ml of $TiCl_4$ were added thereto for reacting with agitation at 110° C. for two additional hours. After the completion of the reaction, the solid was filtered and washed 4 times with 100 ml of anhydrous n-heptane at 90° C. and was dried under a reduced pressure to obtain a solid composition (C-5).

(B) Propylene Slurry Polymerization

Propylene polymerization using catalyst component (C-5) was carried out in the same manner as described in Example 3. The results are shown in TABLE 2.

Example 4

(A) The Preparation of a Solid Catalyst Component (A-4)

A three neck 250 ml flask equipped with fritted filter disk and mechanical stirrer, which is thoroughly purged with nitrogen, was charged with 87 mmol of magnesium ethoxide and 80 ml of anhydrous toluene to form a suspension. To the suspension was added 1.5 mmol of 1-ethyl-2,3-piperazinedione and injected 20 ml of $TiCl_4$ and was then heated up to a temperature of 90° C. 8.5 mmol of 9,9-bis(methoxymethyl)fluorine and 3.0 mmol of dicyclopentyldimethoxysilane were added thereto, followed by heating up to 110° C. with agitation at that temperature for 2 hours. After the completion of the reaction, the resulting solid was filtered and washed twice with 100 ml of anhydrous toluene at 90° C., and 80 ml of fresh anhydrous toluene and 20 ml of $TiCl_4$ were added thereto for reacting with agitation at 110° C. for two additional hours. After the completion of the reaction, the solid was filtered and washed 7 times with 100 ml of anhydrous n-heptane at 90° C. and was dried under a reduced pressure to obtain a solid composition (A-4).

(B) Propylene Slurry Polymerization

Propylene polymerization using catalyst component (A-4) was carried out in the same manner as described in Example 3. The results are shown in TABLE 3.

Example 5

Preparation of solid catalyst component (A-5) was carried out in the same way as Example 4, except that 1.5 mmol of dicyclopentyl(dimethoxyl)silane (D-donor) were added.

(B) Propylene Slurry Polymerization

Propylene polymerization using catalyst component (A-5) was carried out in the same manner as described in Example 3. The results are shown in TABLE 3.

Comparative Example 6

(A) The Preparation of a Solid Catalyst Component (C-6)

Preparation of solid catalyst component (C-6) was carried out in the same way as Example 4, except that 10.0 mmol of 9,9-bis(methoxymethyl)fluorine was added as the internal donor and dicyclopentyl(dimethoxyl)silane (D-donor) or 1-ethyl-2,3-piperazinedione were not added.

(B) Propylene Slurry Polymerization

Propylene polymerization using catalyst component (C-6) was carried out in the same manner as described in Example 3. The results are shown in TABLE 3.

TABLE 1

(Bulk Polymerization)

| Example number | Catalyst component | Internal Donor (mmol)/87 mmol Mg | Oxalic acid diamide* (mmol) | Silane (mmol) | External donor (mmol) | Activity (gPP/gcat) | MFR (g/10 min) | HI (%) |
|---|---|---|---|---|---|---|---|---|
| Example 1 | A-1 | DiBP(8.5) | 1.5 | H (1.5) | D(0.25) | 45,000 | 9.7 | 97.8 |
| Example 2 | A-2 | DiBP(8.5) | 1.5 | D (3.0) | D(0.25) | 37,934 | 11.1 | 98.1 |
| Comparative example 1 | C-1 | DiBP (10.0) | 0 | 0 | D(0.25) | 41,677 | 11.9 | 96.6 |
| Comparative example 2 | C-2 | DiBP(8.5) | 1.5 | 0 | D(0.25) | 41,134 | 10.0 | 97.6 |

*H = diisopropylterahydrofurylmethoxysilane
D = dicyclopentyldimethoxysilane
P = diisopropyldimethoxysilane
DiBP = diisobutylphthalate

TABLE 2

(Slurry Polymerization)

| Example number | Catalyst | Internal Donor (mmol)/61 mmol Mg | Oxalic acid diamide (mmol) | Silane (mmol) | H2 (psi) | External donor (mmol) | Activity (gPP/gcat) | MFR (g/10 min) | HI (%) |
|---|---|---|---|---|---|---|---|---|---|
| Example 3 | A-3 | DEIPM(3.0) + DEPHM(3.0) | 2.0 | TEOS (5.4) | 8 | P(0.5) | 2313 | 4.3 | 99.0 |
|  |  |  |  |  | 32 | P(0.5) | 2493 | 28.6 | 98.8 |
|  |  |  |  |  | 16 | D(0.5) | 2473 | 9.4 | 99.1 |
| Comparative Example 3 | C-3 | DEIPM(3.0) + DEPHM(3.0) | 0.0 | 0.0 | 16 | P(0.5) | 3156 | 12.3 | 97.0 |
|  |  |  |  |  | 8 | P(0.5) | 2626 | 7.9 |  |
|  |  |  |  |  | 32 | P(0.5) | 3080 | 43.4 |  |
|  |  |  |  |  | 16 | D(0.5) | 3360 | 10.2 | 97.0 |
| Comparative Example 4 | C-4 | DEIPM(3.0) + DEPHM(3.0) | 1.5 | 0 | 8 | P(0.5) | 2213 | 4.0 | 98.6 |
|  |  |  |  |  | 32 | P(0.5) | 3040 | 28.8 | 98.3 |
|  |  |  |  |  | 16 | D(0.5) | 3163 | 8.1 | 98.6 |
| Comparative Example 5 | C-5 | DiBP (7.0) | 0.0 | 0.0 | 32 | P(0.5) | 3850 | 24.5 | 98.3 |
|  |  |  |  |  | 16 | D(0.5) | 3660 | 5.1 | 98.7 |

(*)DEIPM = Diethylisopropylmalonate
DEPHM = Diethylphenylmalonate
TEOS = tetraethylorthosilicate
DiBP = diisobutylphthalate

TABLE 3

(Slurry Polymerization)

| Example number | Catalyst | Internal Donor (mmol)/87 mmol Mg | Oxalic acid diamide (mmol) | Silane (mmol) | External donor (mmol) | Activity (gPP/gcat) | MFR (g/10 min) | HI (%) |
|---|---|---|---|---|---|---|---|---|
| Example 4 | A-4 | Diether(8.5) | 1.5 | D(3.0) | P(0.2) | 5437 | 7.8 | 98.8 |
|  |  |  |  |  | P(0.4) | 5627 | 7.6 | 98.9 |
|  |  |  |  |  | P(0.8) | 4987 | 8.3 | 99.0 |
| Example 5 | A-5 | Diether(8.5) | 1.5 | D(1.5) | P(0.2) | 5940 | 8.4 | 98.7 |
|  |  |  |  |  | P(0.4) | 5800 | 7.2 | 98.9 |
|  |  |  |  |  | P(0.8) | 5017 | 7.1 | 99.1 |
| Comparative Example 6 | C-6 | Diether (10.0) | 0.0 | 0.0 | P(0.2) | 6604 | 4.9 | 98.3 |
|  |  |  |  |  | P(0.4) | 6227 | 5.0 | 98.3 |
|  |  |  |  |  | P(0.8) | 5750 | 4.8 | 98.6 |

(*)Diether = 9,9-bis(methoxymethyl)fluorene
D = dicyclopentyldimethoxysilane

As is clear from the above results shown in Table 1, Table 2 and Table 3, the solid catalyst system according to present invention employing both oxalic acid diamide (1-ethyl-2,3-piperazinedione) and a silane component has achieved enhanced isotacticity in polypropylene production over the catalyst system that does not contain oxalic diamide and silane components, while maintaining high activity and excellent hydrogen response in both bulk polymerization and slurry polymerization. As illustrated in bulk polymerization, for instance, in Table 1, A1-A2 catalyst components obtained according to the present invention containing DiBP as an internal donor produced polypropylene with a % HI of 97.9-98.1 in Ex. 1 and Ex. 2 which is much higher than those (% HI of 96.6-97.6) that does not contain oxalic acid diamide or silane components (C1, C2 catalyst component) in Comp. Ex. 1 and Comp. Ex. 2. Slurry polymerization results demonstrate the same trend as shown in Table 2 and Table 3, when employing diethylisopropylmalonate/diethylphenylmalonate/oxalic acid diamide/silane compounds as an internal donor system or diether (such as 9,9-bis(methoxymethyl)fluorine)/oxalic acid diamide/silane compounds as an internal donor system.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Whenever a numerical range with a lower limit and an upper limit is disclosed, any number falling within the range is specifically disclosed. Moreover, the indefinite articles "a" or "an", as used in the claims, are defined herein to mean one or more than one of the element that it introduces.

What is claimed is:

1. A method of preparing a propylene impact copolymer, comprising polymerizing propylene and one or more alpha olefin comonomers in the presence of a solid catalyst component comprising: titanium, magnesium, halogen, internal electron donors, oxalic acid diamide, and a silane compound;
wherein the oxalic acid diamide is selected from the compounds of the formula:

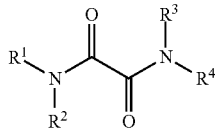

wherein $R^1$, $R^2$, $R^3$, and $R^4$ are independently selected from hydrogen, an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing hydrocarbon group of 1 to 20 carbon atoms;
wherein the silane compound is selected from the compounds of the formula:

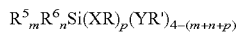

wherein $R^5$, $R^6$, R, and R' are independently selected from hydrogen, an aliphatic hydrocarbon group having 1 to 20 carbon atoms, an alicyclic hydrocarbon group having 3-20 carbon atoms, an aromatic hydrocarbon group having 6-20 carbon atoms, or a hetero atom containing a hydrocarbon group of 1 to 20 carbon atoms;
wherein X and Y are independently selected from O, S, $NR_a$, and $NR_b$, wherein $R_a$ and $R_b$ are hydrocarbon groups;
wherein m and n are integers between 0 and 2, p is an integer between 1 and 4, and m+n+p is an integer between 0 and 4.

2. The method of claim 1, wherein two or more of $R^1$, $R^2$, $R^3$, and $R^4$ may be linked to form one or more saturated or unsaturated monocyclic or polycyclic rings.
3. The method of claim 1, wherein two or more of $R^5$, $R^6$, R, R' may be linked to form one or more saturated or unsaturated monocyclic or polycyclic rings.
4. The method of claim 1, wherein the oxalic acid diamide is 1-ethyl-2,3-piperazinedione.
5. The method of claim 1, wherein the silane compound is selected from diisopropyltetrahydrofurylmethoxysilane, dicylopentyldimethoxysilane, diisopropyldimethoxysilane, cyclohexylmethyldimethoxysilane, isobutylisopropyldimethoxysilane, and tetraorthosilicate.
6. The method of claim 1, wherein at least one of internal electron donors are selected from esters of phthalic acid.
7. The method of claim 6, wherein the esters of phthalic acid are diisobutylphthalate, di-n-butylphthalate, di-iso-octylphthalate, diisopropylphthalate, diethylphthalate, or dipentylphthalate.
8. The method of claim 1, wherein at least one of the internal electron donors are selected from esters of malonic acid.
9. The method of claim 8, wherein the esters of malonic acid are selected from: diethyldiisobutylmalonate, dimethyldiisopropylmalonate, diethyldi-n-butylmalonate, diethyldi-isopropylmalonate, and diethyldiphenylmalonate.
10. The method of claim 1, wherein at least one of internal electron donors are selected from 1,3-diether compounds.
11. The method of claim 10, wherein the 1,3 diether compounds are selected from: 9,9-bis(methoxymethyl)fluorene; 9,9-bis(methoxymethyl)-2,3,6,7-tetramethylfluorene; 9,9-bis(methoxymethyl)-2,3,4,5,6,7-hexafluorofluorene; 9,9-bis(methoxymethyl)-2,3-benzofluorene; 9,9-bis(methoxymethyl)-2,3,6,7-dibenzofluorene; 9,9-bis(methoxymethyl)-2,7-diisopropylfluorene; 9,9-bis(methoxymethyl)-1,8-dichlorofluorene; 9,9-bis(methoxymethyl)-2,7-dicyclopentylfluorene; 9,9-bis(methoxymethyl)-1,8-difluorofluorene;
9,9-bis(methoxymethyl)-1,2,3,4-tetrahydrofluorene; 9,9-bis(methoxymethyl)-1,2,3,4,5,6,7,8-octahydrofluorene; and 9,9-bis(methoxymethyl)-4-tert-butylfluorene.
12. The method of claim 10, wherein the 1,3 diether compounds are selected from: 2-(2-ethylhexyl)-1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-diethoxypropane, 2-cumyl-1,3-diethoxypropane, 2-(2-phenylethyl)-1,3-dimethoxypropane, 2-(2-cyclohexylethyl)-1,3-dimethoxypropane, 2-(p-chlorophenyl)1,3-dimethoxypropane, 2-(diphenylmethyl)-1,3-dimethoxypropane, 2-(1-naphthyl)-1,3-dimethoxy propane, 2,2-fluorophenyl)-1,3-dimethoxypropane, 2-(1-decahydronaphthyl)-1,3-dimethoxypropane, 2-(p-t-butylphenyl)-1,3-dimethoxypropane, 2,2-dicyclohexyl-1,3-dimethoxypropane, 2-isopentyl-2-isopropyl-1,3-dimethoxypropane, 2,2-diisobutyl-1,3-dimethoxypropane; 2-isopropyl 2-isopentyl-1,3-dimethoxypropane; and 2,2-bis(cyclohexylmethyl)-1,3-dimethoxypropane.
13. The method of claim 1, wherein at least one of the internal electron donors are selected from esters of succinic acid compounds.
14. The method of claim 1, wherein at least one of the internal donors are selected from esters of diol compounds.

* * * * *